US008441498B2

(12) United States Patent
Lammers et al.

(10) Patent No.: US 8,441,498 B2
(45) Date of Patent: May 14, 2013

(54) DEVICE AND METHOD FOR PROCESSING COLOR IMAGE DATA

(75) Inventors: Matheus J. G. Lammers, Nederweert (NL); Petrus M. De Greef, Waalre (NL)

(73) Assignee: Entropic Communications, Inc., San Diego, CA (US)

( * ) Notice: Subject to any disclaimer, the term of this patent is extended or adjusted under 35 U.S.C. 154(b) by 958 days.

(21) Appl. No.: 12/516,785

(22) PCT Filed: Nov. 20, 2007

(86) PCT No.: PCT/IB2007/054707
§ 371 (c)(1),
(2), (4) Date: May 28, 2009

(87) PCT Pub. No.: WO2008/065575
PCT Pub. Date: Jun. 5, 2008

(65) Prior Publication Data
US 2010/0020242 A1    Jan. 28, 2010

(30) Foreign Application Priority Data

Nov. 30, 2006   (EP) ..................... 06125110

(51) Int. Cl.
*G09G 5/02* (2006.01)
(52) U.S. Cl.
USPC ........................................................ 345/589
(58) Field of Classification Search .................... 345/589
See application file for complete search history.

(56) References Cited

U.S. PATENT DOCUMENTS

| 7,986,291 B2 * | 7/2011 | Van Mourik et al. ........... 345/88 |
| 2004/0021672 A1 | 2/2004 | Wada |
| 2004/0170319 A1 | 9/2004 | Maurer |

FOREIGN PATENT DOCUMENTS

WO   2005/109854 A1   11/2005

OTHER PUBLICATIONS

De Greef, Pierre, et al; "46.2: Lifepix Image Enhancement for Mobile Displays" 2005 SID Intl Symposium; Boston, MA, US; May 24-270, 2005; pp. 1488-1491; XP007012331.

\* cited by examiner

*Primary Examiner* — Jeffrey Chow
(74) *Attorney, Agent, or Firm* — Bruce Greenhaus; Richard Bachand; Duane Morris LLP

(57) ABSTRACT

The present invention relates to a video processing device comprising a luminance and saturation detector (LSHD) for detecting the luminance values (lum) and the saturation values (sat) of pixels of an input video signal (IN); and a white-point, saturation and hue modulator (WSH) for transforming luminance and saturation properties (lum, sat) of the pixels of the input video signal (IN) into white-point, saturation and hue correction factors (W, Wc; S, Sc; H, Hc). The video device also comprises a color gamut matrix generating unit (CGMG) for generating a color gamut matrix in the perception domain based on the white-point, saturation and hue correction factors (Wc, Sc, Hc) of the white-point, saturation and hue modulator (WSH); a color gamut mapping unit (20) for multiplying the pixels of the input video signal (IN) with a color gamut matrix generated by the color gamut matrix generating unit (CGMG); and a clipping unit (31) for clipping the results of the a color gamut mapping unit (20) which are out of a predefined range.

16 Claims, 14 Drawing Sheets

DEVICE AND METHOD FOR PROCESSING COLOR IMAGE DATA

FIELD OF THE INVENTION

The present invention relates to a video processing device and a method for processing color image data.

BACKGROUND OF THE INVENTION

More and more mobile electronic devices are designed with a color display device for displaying color images. These color images can for example be generated by a camera or a video processor. The supplied color image data may have to undergo an image processing to improve the appearance of the image on the display device. Nowadays, multi-media data have to be displayed in a mobile phone, in a multi-media portable player, etc. Typically, the display technology used in these mobile devices has some limitations, in particular with respect to the picture quality and the color reproduction. The colors of the supplied image data are typically encoded according to already existing standards. These standards have been selected to facilitate a design of displays based on the available materials. Accordingly, as long as a camera or a display match the chosen standard, a reasonable reproduction of the colors or image data may be expected.

On the other hand, LCD displays in particular for mobile applications may not be able to meet the requirements of these standards. One of these standards is the sRGB standard, which defines the x-y coordinates of the red, green and blue light source in connection with a reference white point. The primary RGB coordinates of the sRGB standard define a triangle drawn in the Y-xy diagram. The Y component represents the luminance of a pixel (perpendicular to the x-y axis) while the x-y coordinate relates to a unique color with respect to saturation and hue. Preferably, the color coordinates of each encoded pixel lie inside or on the border of this triangle. For many mobile LCD displays, their display triangle is smaller than the sRGB reference resulting in several artifacts. These artifacts may include a lack of saturation due to a smaller gamut of the display of the mobile device. A further artifact may relate to hue errors as the color display primaries do not match the sRGB standard primary values. Furthermore, the reference white point may be shifted such that black and white parts in a scene may be represented in a color.

To cope with these problems, color gamut mapping is used to process input pixels such that the colors on a display with a smaller gamut are reproduced to match a reference display.

WO 2005/109854 discloses a method for processing color image data to be displayed on a target device. Input pixel data within a source color gamut is received. The input pixel data in said source color gamut is mapped to a target color gamut which can be associated to a target device. The mapping is controlled according to a color saturation value of the input pixel data.

FIG. 1 shows a block diagram of a basic color gamut mapping. The input image data IN are processed by gamma function 10. The output of the gamma function 10 undergoes a color gamut mapping function 20 by processing the input pixel data with a static matrix (3×3). The output of the color gamut mapping function 20 is processed by a hard clipper function 30. Here, negative values of R, G, B are clipped to zero and a value of the RGB is set to 2096 for 36-bit RGB pixel data if the value of the RGB is larger than 2096. The output of the hard clipper function 30 is processed by the de-gamma function 40 and the output OUT of the de-gamma function 40 is supplied to a display in a target device. The gamma function 10 is required as the input image data IN or pixels relate to the video domain. The values of the RGB signal are now proportional to the luminance of the three primary light sources. By performing a gamut mapping, light sources are linearly mixed to achieve a desired color. Gamut mapping is preferably performed in the light domain. The gamma transformation performed in the gamma function 10 corresponds to a non-linear operation and may increase the resolution of the RGB signal in the digital domain. The coefficients of the gamut mapping matrix in the gamut mapping function 20 are chosen such that an input RGB luminance value can be directly mapped into a new RGB luminance value for the display of the mobile application. In other words, the matrix is designed to adapt the ratio between the RGB subpixels. The coefficients of the gamut mapping matrix can be calculated:

$$MTX_{cgm} = (MTX_{disp})^{-1} \cdot MTX_{sRGB}$$

wherein the $MTX_{sRGB}$ and the $MTX_{disp}$ matrices are used to translate a RGB value to the XYZ domain. These matrices are determined based on the primary colors and a reference white point.

However, the above described color gamut mapping may lead to subpixels which are out of range (negative or positive out of range). To avoid such values, a clipping operation (hard, soft or smart) is performed. The inverse gamma function is used to transform the pixels back to the video domain as a display typically cannot handle the luminance values directly, e.g. due to standard interface display driver hardware.

FIG. 2 shows two graphs for illustrating problems arising from a color gamut mapping. In the upper graph, a color triangle of the input image data and of the output image data are displayed. In the lower graph, color triangle watched from the side is depicted. In the upper diagram, the input stimuli Is represent scanned lines, wherein for each scanned line the saturation is increased in steps of 10%. The twelve lines depicted in the lower diagram comprise a constant hue. The result of color gamut mapping OM is depicted in the same diagram. The x-y diagram is taken at a constant perceptive luminance level of 30% and output values above or below this luminance are color coded (red/blue) until a threshold of 5% is exceeded. Those part of the line where the threshold is exceed are labelled with UT. Accordingly the color gamut mapping works well for pixels that coincide both triangles.

In the lower diagram, the luminance on the vertical axis is shown while the blue-yellow color space surface is watched from aside. The flat lines represent the input stimuli Is. The bended lines show the luminance of the display if no gamut mapping is performed at all. The lines MO show the result after color gamut mapping. Accordingly, the gamut mapping works well in the luminance direction for pixels that coincide with both triangles.

However, the following gamut mapping problems may arise. Those pixels which fall outside the display triangle may generate negative values after mapping, i.e. negative light is required to reproduce this particular color on the display. As this is physically not possible, these negative values must be clipped off to a value the display can represent. The upper diagram shows the problem area at the corner of the display triangle. Moreover, pixels with high amplitude may lay outside the display range and have to be therefore limited to a value, which can be physically represented. The lower Y-x-y diagram depicts a problem area at the right top where the lines UMO clip against the ceiling. In general, any sudden discontinuity in the first derivative of the luminance will lead to visible artifacts in the resulting image. This artifact can be seen at the right side of the Y-x-y diagram where the luminance suddenly bends upwards. Therefore, a trade-off is required between the color gamut mapping and the (soft) clipping.

SUMMARY OF THE INVENTION

It is an object of the present invention to provide a video processing device and a method for performing a more efficient color gamut mapping with reduced hardware resources.

This object is solved by a video processing device according to claim 1 and by a method according to claim 6.

Therefore, a video processing device is provided which comprises a luminance and saturation detector for detecting the luminance values and the saturation values of pixels of an input video signal and a white-point, saturation and hue modulator for transforming luminance and saturation properties of the pixels of the input video signal into white-point, saturation and hue correction factors. The video device also comprises a color gamut matrix generating unit for generating a color gamut matrix in the perception domain based on the white-point, saturation and hue correction factors of the white-point, saturation and hue modulator, a color gamut mapping unit for multiplying the pixels of the input video signal with a color gamut matrix generated by the color gamut matrix generating unit, and a clipping unit for clipping the results of the a color gamut mapping unit which are out of a predefined range.

According to an aspect of the invention the luminance and saturation detector comprises a RGB squaring unit for squaring amplitudes of sub-pixels of the input video signal, a RGB shuffler unit for ranking the squared sub-pixels based on their amplitude value; a luminance and saturation calculation unit for calculating a value of the luminance, an internal saturation and a saturation correction factor; and a saturation correction unit for outputting a corrected saturation value.

According to a further aspect of the invention the white-point, saturation and hue modulator comprises a white point modulator for determining a white-point correction factor based on the luminance value from the luminance and saturation calculation unit, a saturation modulator for determining a saturation correction factor based on the saturation value from the luminance and saturation calculation unit, and a hue modulator for determining a hue correction factor based on the saturation value from the luminance and saturation calculation unit.

According to still a further aspect of the invention the color gamut matrix generating unit is adapted to generate the color gamut matrix based upon measured characteristics of a display module such that the color gamut matrix can be apated to the actual display module.

The invention also relates to a method of processing color image data. The luminance values and the saturation values of pixels of an input video signal are detected by a luminance and saturation detector. The luminance and saturation properties of the pixels of the input video signal are transformed into white-point, saturation and hue correction factors by a white-point, saturation and hue modulator. A color gamut matrix is generated in the perception domain based on the white-point, saturation and hue correction factors of the white-point, saturation and hue modulator by a color gamut matrix generating unit. The pixels of the input video signal are multiplied with a color gamut matrix generated by the color gamut matrix generating unit by a color gamut mapping unit. The results of the a color gamut mapping unit which are out of a predefined range are clipped by a clipping unit.

The present invention relates to the realization that the color gamut mapping algorithms take measures to avoid clipping and preserve contrast at several points, wherein a duplication of functionality might be expected. A saturation dependent attenuation is present in front of the video matrix while the matrix itself may also be able to perform a saturation dependent attenuation. The soft clipper adjusts values below and above the operating range of the display. However, if it is possible to detect these situations, the matrix coefficients can be modified to avoid severe negative and positive values and the soft clipper can be replaced by a much cheaper hard clipper (in terms of hardware resources). Furthermore, the color gamut mapping is executed in the linear light domain. This is however disadvantageous as a matched gamma and de-gamma functional block is required. These operations are non linear, such that they require a lot of calculations in hardware or relatively large lookup tables. Moreover, values, resulting from the gamma operation, must be represented in a higher resolution (e.g. an increase of a linear 8 bit input to a 12 bit output) or in a non-linear representation (exponent-mantissa) to avoid quantization noise. In addition, the video matrix operation must be executed in the numerical representation chosen that represent the luminance values of the gamma operation. Since the video matrix requires nine multiplications and six additions, the amount of consumed hardware resources and power dissipation can be a disadvantage.

With the video processing device according to the invention the previously required gamma and de-gamma function can be omitted, i.e. the color gamut mapping is performed directly in the video domain, i.e. the video perceptive domain. Moreover, the required 8 bit video values can be used to calculate the color gamut mapped output pixels directly. The coefficients of the color gamut matrix (calculated according to the EBU standard) as well as the display data in the linear light domain are corrected to handle the missing gamma block and pixel colors around the white point are mapped as if the gamma function is present. The soft clipper used according to the prior art can be replaced by a hard clipper as the coefficients of the color gamut matrix are modified to avoid severe clipping. This modification is achieved by the adaptive path in the video processing device according to the invention. In the adaptive branch of the video processing device the properties to reduce a white-point, a hue and a saturation correction are determined based on a simple luminance and saturation value and the optimal coefficients are derived for each pixel. While the color gamut mapping is performed completely in the video branch of the video device, the adaptive branch is merely used to prevent a loss of detail (e.g. by clipping) and to preserve the contrast of an image. A loss of detail may occur for artificial images as the mapping algorithm may not be aware of spatial and temporal relations between pixels. The reduction of parameters for the white-point, saturation and hue may be determined directly, as a direct relation is present between the color gamut matrix coefficients and clipping artifacts. Furthermore, the number of bits in a ROM for storing static mapping data is reduced. E.g. if a 24 bit pixel application is taken into account, a display can be characterized by 9*5 bits+3*4 bits of ROM storage capacity.

BRIEF DESCRIPTION OF THE DRAWINGS

These and other aspects of the invention will be apparent from and elucidated with reference to the embodiments described hereinafter.

DETAILED DESCRIPTION OF EMBODIMENTS

Figure 1:
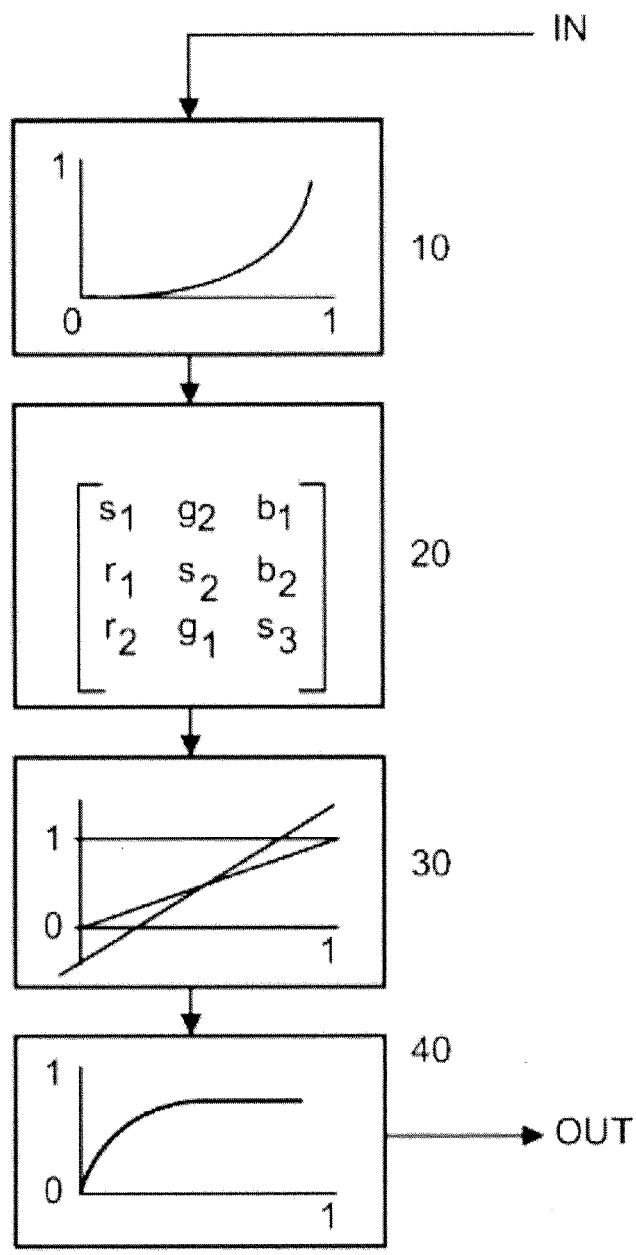
FIG. 1 shows a block diagram of a basic color gamut mapping.
Figure 2:
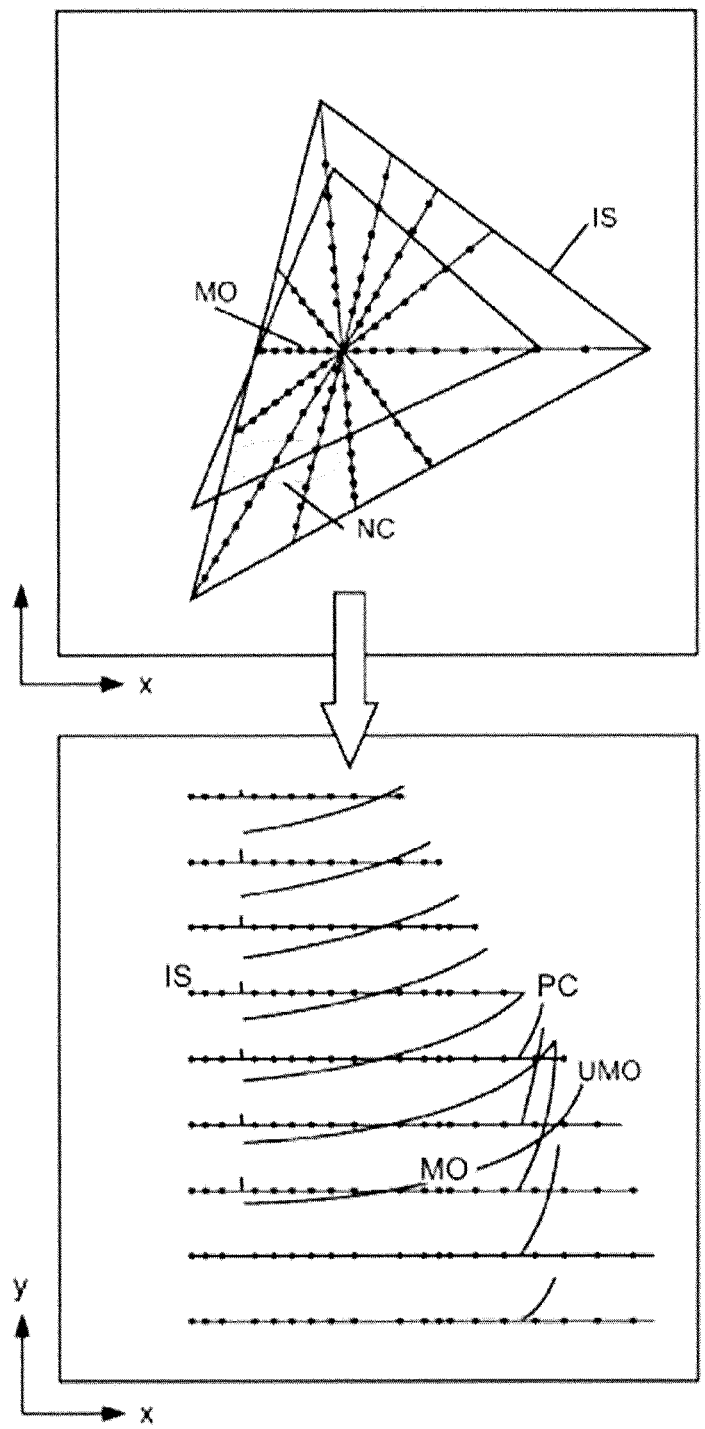
FIG. 2 shows two graphs for illustrating problems arising from a color gamut mapping.
Figure 3:
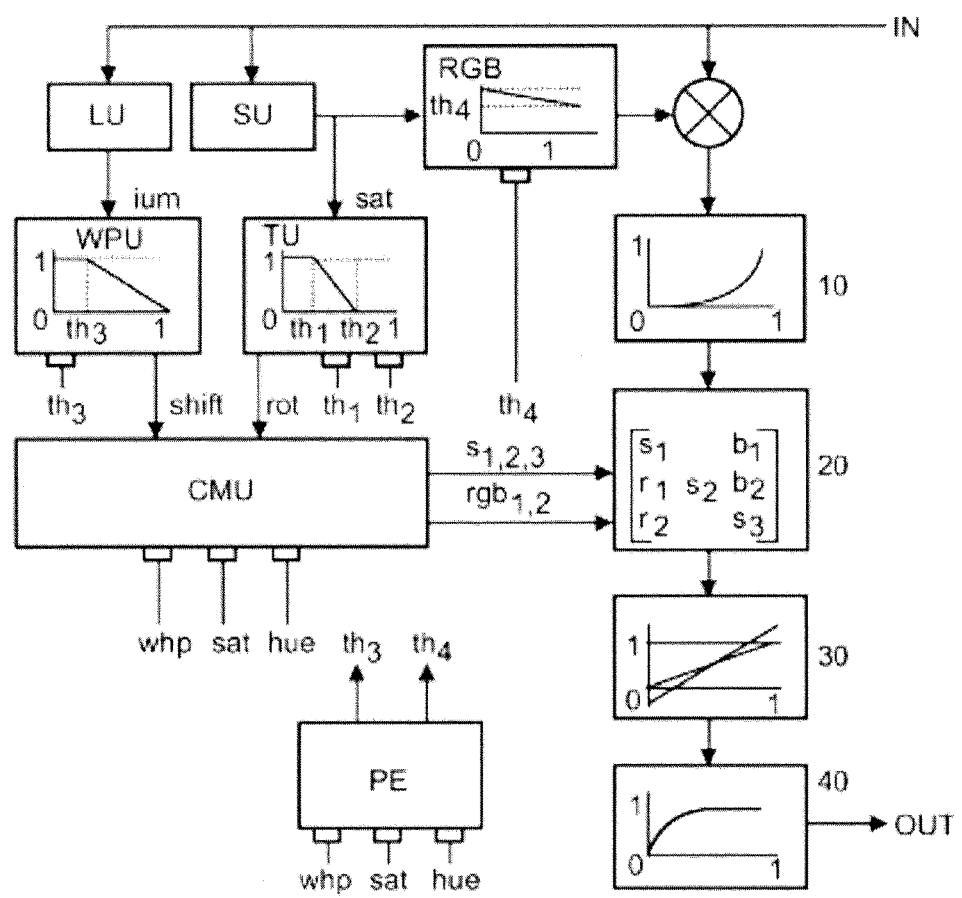
FIG. 3 shows block diagram of a gamut mapping system in the light domain according to the prior art.

FIG. 3 shows a block diagram of a gamut mapping system in the light domain. An input video signal IN is processed by the video path, i.e. by the gamma function 10, by the adaptive color gamut mapping function 20, by a soft clipper function 30 and by the degamma function 40 (as described according to FIG. 1). The adaptive processing for the adaptive color gamut function is performed by a luminance unit LU, a saturation unit SU, a RGB unit RGB, a white point unit WPU, a triangle unit TU and by a color matrix unit CMU. The luminance unit LU measures the luminance of the input signal IN and the saturation unit SU measures the saturation of the input signal IN. Optimal coefficients are determined based on the measured luminance lum and saturation sat. The mapping coefficients for the color gamut mapping are calculated from predefined coefficients, i.e. parameters inserted at the color gamut matrix generator by means of the shift and rotate values for every pixel. The video matrix coefficients are modified under circumstances where clipping has to be avoided at the cost of less color correction. For those pixels, it is more important to preserve the details and contrast in the resulting image. A trade-off between color mapping and clipping prevention has to be made carefully since no spatial or temporal pixel information is available to the color gamut mapping algorithm.

The decision whether a pixel needs to be color mapped or requires a set of modified coefficients for the video matrix may be based on the case when a pixel has a high luminance, (i.e. the white point correction is skipped) or on the case when a pixel has a high saturation, (i.e. the hue is not corrected).

Hence, the white point correction is skipped if a pixel has a high luminance. Accordingly, the diagonal coefficients s1 to s3 in the video matrix 20 are modified such that the sum of the rows is equal to one. A White point correction implies that at least one of the sub-pixels has a gain above one and that clipping will occur if the sub-pixel's amplitude is also high. Any unsaturated pixels with high amplitude will therefore get the color of the backlight as the white point is not corrected anymore. If the white point of the backlight is chosen such that its color is shifted towards blue, the perceived pixel luminance will appear to be brighter, which can be advantageous. Therefore, pixels with low luminance amplitude will have the correct white point according to the sRGB standard while pixels with a high luminance will get the bluish white point of the backlight and thereby appear to be brighter.

Figure 4:
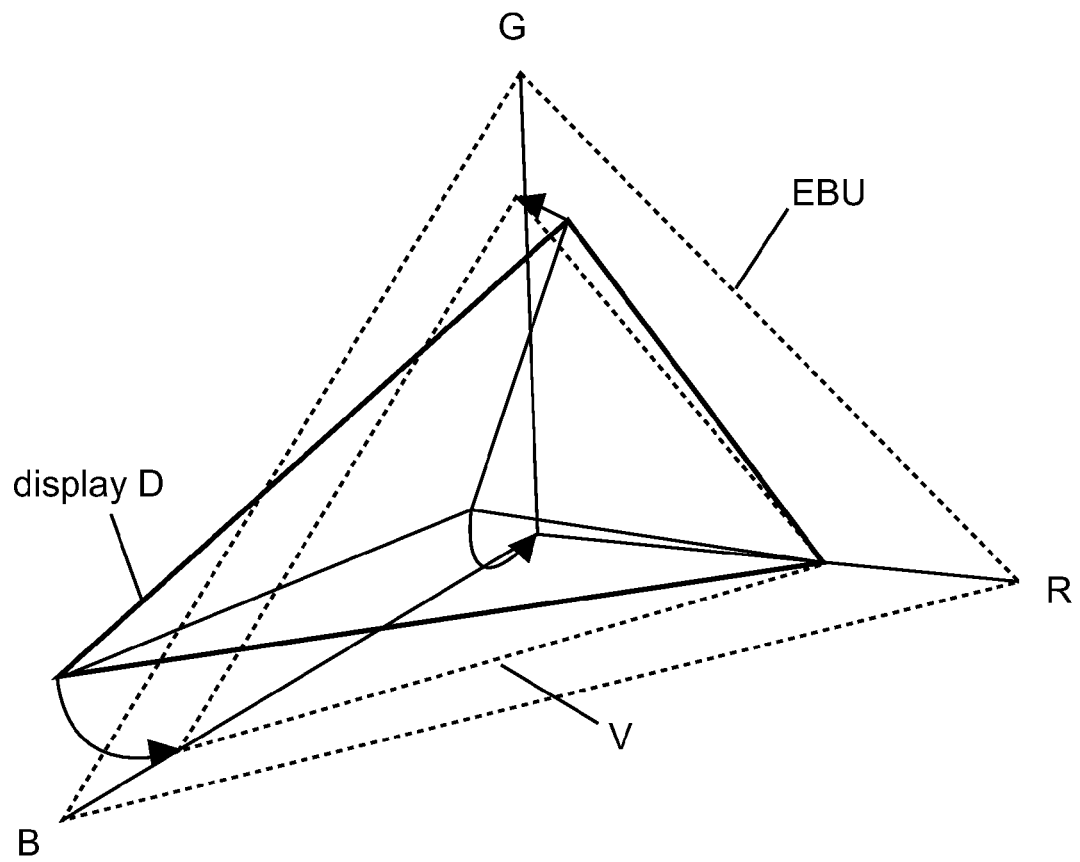
FIG. 4 shows an illustration of a reduction of the hue correction.

On the other hand, if a pixel has a high saturation, the hue is not corrected anymore, i.e. the red, green and blue coefficients r1, r2, g1, g2, b1 and b2 are averaged (r1=r2=average (r1, r2) and so on). The resulting "virtual" display triangle VDT vertices are lying on the lines that can be drawn between the primary colors and the white point of the input standard according to FIG. 4. The lack of saturation is still corrected by the video matrix. Hence, if e.g. red needs more gain (saturation), the red amplitude is increased to produce more red light in the primary color of the display. So if the color of red is wrong (hue), it will not be corrected anymore. The basic idea behind this way of clipping is that for high saturations, the display will still be fully driven and maximum contrast is achieved.

A saturation dependent attenuation is required before entering the video matrix to reduce the amplitude of highly saturated colors. Now, these colors will produce less negative values after color gamut mapping and thereby are easier to handle in the soft clipper. A soft clipper is still required to make sure that the values presented at the de-gamma block are in range. Negative values are removed by adding white to all three sub-pixels. This will reduce the saturation without disturbing the pixel's hue. Next, sub-pixel amplitudes above one are detected and, in that case, the amplitudes are reduced such that they are just in range.

According to the above described adaptive color gamut mapping the front of screen performance of the display is increased such that perceived colors are matched more closer to the input standard. However, in such a color gamut mapping process measures must be taken to avoid artifacts such as loss of detail and contrast.

Figure 5:
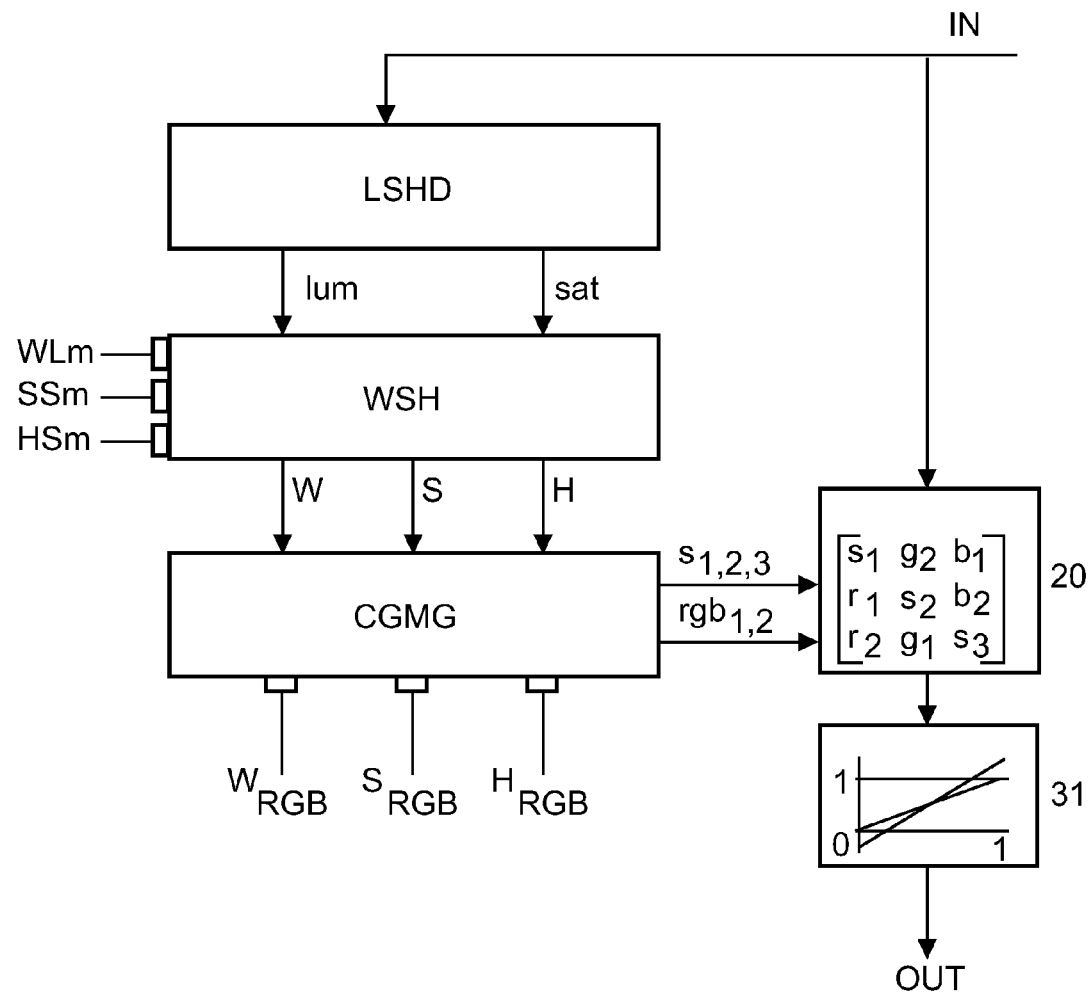
FIG. 5 shows a block diagram of a color gamut mapping system in the perceptive domain according to a first embodiment.

FIG. 5 shows a block diagram of a color gamut mapping system in the perceptive domain according to a first embodiment. The color gamut mapping system comprises a luminance and saturation detector LSHD, a white point, saturation and hue modulator WSH, a color gamut matrix generator CGMG, an adaptive color gamut mapping unit 20 and a hard clipper unit 31.

The luminance and saturation detector LSHD receives the input signal IN and derives the luminance lum and the saturation sat from a pixel by means of a simplified module. The hue of the pixel is also used in order to compensate the measured saturation for a case that the respective color vector points to a secondary color.

The white point, saturation and hue modulator WSH implements three functions transforming the luminance lum and saturation sat of a pixel to those values which are required for white point W, saturation S and hue H correction. The output of the modulator may constitute normalized values indicating the amount of the originally measured data may be part of the coefficients of the video matrix. The modulator WSH also receives three input values, namely WLm, SSm, HSm. These three values indicate characteristics of the three transfer functions.

The color gamut matrix generator CGMG receives the three output signals W, S, H from the white point, saturation and hue modulator WSH and outputs the optimal video matrix (i.e. the matrix coefficients s1, s2, s3, r1, r2, b1, b2, g1, g2) for a pixel, which is to be mapped. Static coefficients of the video matrix are encoded in predefined white-point $W_{RGB}$, saturation $S_{RGB}$ and hue $H_{RGB}$ parameters. These parameters determine the color gamut mapping of pixels from the input IN to the output OUT. If the coefficients of the static matrix are modified in order to reduce the required amount of white point, saturation and hue correction, the quality of the color gamut mapping will deteriorate. However, some details and contrast will be preserved as a clipping is prevented. The parameters $W_{RGB}$; $S_{RGB}$; $H_{RGB}$ as well as WLm, SSm, HSm are used to characterize a display which is to be driven by the video processing system.

Accordingly, the color mapping system according to FIG. 5 is able to operate directly in the video (perceptive) domain. The color gamut mapping unit 20 and the hard clipper unit 31 constitute the video processing path while the luminance and saturation detector LSHD, the white point, saturation and hue modulator WSH and the color gamut matrix generator CGMG relate to the adaptive processing path, which serves to prevent a loss of detail e.g. by clipping and to prevent contrast in the image. The input pixels from an input reference system SRGB are mapped to a corresponding display reference system. This is performed by multiplying the input pixel vector with a three-by-three matrix in the color gamut mapping unit 20. If the result of this processing is out of the range, these values can be hard-clipped by the hard clipper unit 31. In particular, values greater than 1 are clipped to 1 and values below zero are clipped to 0. The units for the adaptive processing (LSHD, WSH, CGMG) are used to ensure that the pixels will be mapped without a loss of detail or contrast. The units of the adaptive processing may also be used to implement a soft clipping function. Hence, the color gamut mapping is performed by the units for the video processing while the units for the adaptive processing modify the coefficients of the video matrix in order to perform a respective mapping and in order to avoid a severe clipping.

Figure 6:
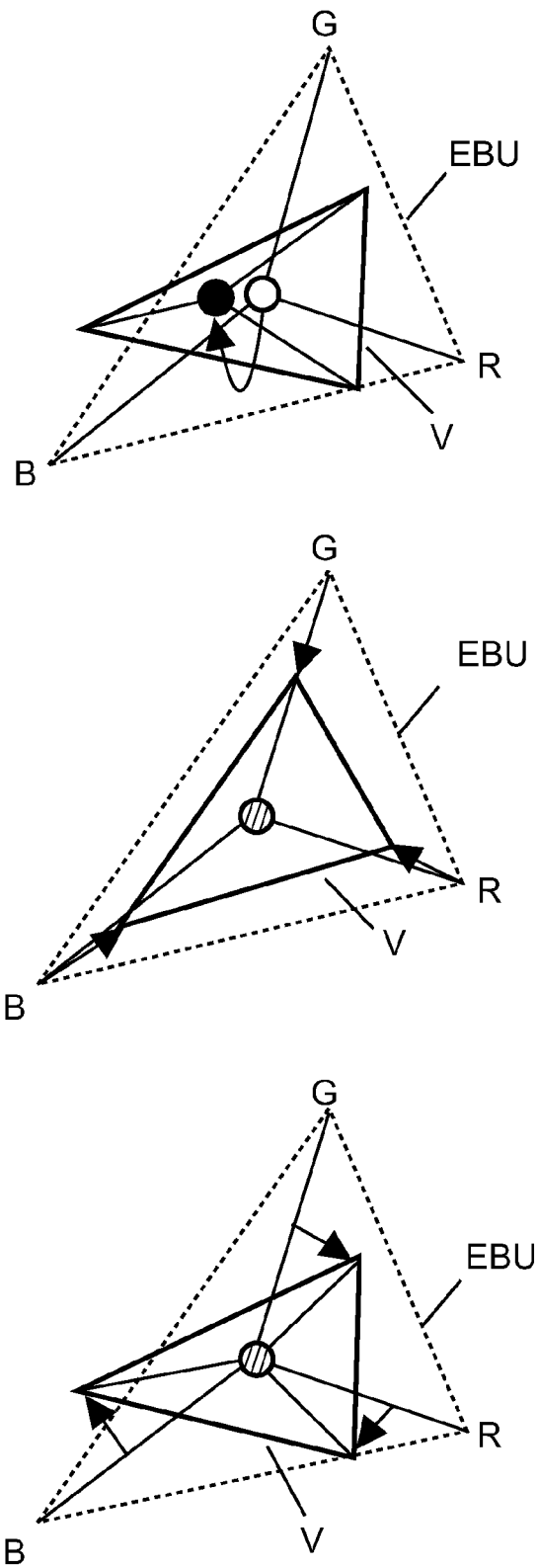
FIG. 6 shows an illustration of a video matrix relationship.

FIG. 6 shows an illustration of a video matrix relationship. In particular, the relationships between the correction parameters and the matrix coefficients are depicted. The matrix coefficients as modified constitute a virtual triangle in the Y-X-Y domain. The arrows in the FIG. 6 depict the effect of the transformation on the virtual triangle V if the matrix coefficients are changed by the corresponding correction.

In the uppermost diagram, the effects of the color gamut matrix generator on the white point parameters are depicted. The white point reference is shifted and the perceived overall hue is changed. In the middle diagram, the effects of the color gamut matrix generator on the saturation parameters is depicted. Here, the virtual triangle V is decreased, the perceived saturation is increased and in independent saturation control for RGB colors is achieved. In the lower diagram, the effect of the color gamut matrix generator on the hue parameters is depicted. The virtual triangle is rotated and the perceived hue has changed. Moreover, an independent hue control for RGB can be achieved.

A relation between the white point, the saturation and the hue correction and the coefficients of the video matrix originate from the fact that the mapping from an input signal in RGB to an output signal in RGB is performed by means of matrix coefficients. However, if a different kind of mapping is performed, the relationship will also be different.

The relationship between the white point correction and the matrix coefficients are as follows:

$$\begin{pmatrix} R \\ G \\ B \end{pmatrix}_{out} = \begin{pmatrix} s_1 + g_2 + b_1 \\ r_1 + s_2 + b_2 \\ r_2 + g_1 + s_3 \end{pmatrix} \cdot V_{in}$$

If an unsaturated pixel vector $V_{in}$ is multiplied with the video matrix, the RGB ratio will be determined by the sum of the rows. Here, the subpixels in the input vector $V_{in}$ will have the same amplitude V. The particular amount of correction which is required if the white point of a display does not correspond to the input standard white point will correspond to the sum of rows. By modifying the sum of rows to 1, the white point correction can be avoided. In the above equations, the coefficients $s_1$, $s_2$ and $s_3$ can be varied. However, modifying the other coefficients is not possible as these coefficients relate to saturation and hue correction.

With respect to the saturation correction, the required amount of saturation mapping for the particular display will correspond to an average of the red, green and blue coefficients: $(r_1+r_2)/2$, $(g_1+g_2)/2$, $(b_1+b_2)/2$. For the case that the coefficients correspond to a color and are equal to the average of this color, the primary display color coordinate can be found on a line between the reference white point and the primary color according to the input standard. A virtual triangle can be obtained by using the averages of these coefficients in the Y-x-y domain. With the virtual triangle, negative averages will result in a smaller gamut triangle size while positive averages will lead to a wider gamut triangle size. If the averages are zero, the triangle size will correspond to the input standard triangle size. If a saturation correction is to be avoided, the red, green and blue averages will have to be modified to equal to zero. As the relationship between the virtual triangle size and the average values of the coefficients is none-linear, the average values can be reduced to zero in order to reduce the amount of saturation correction.

With respect to the hue correction, the hue correction corresponds to differences between coefficients of a color: $(r_1-r_2)$, $(g_1-g_2)$, $(b_1-b_2)$. The hue correction can be avoided by averaging these coefficients.

Figure 7:
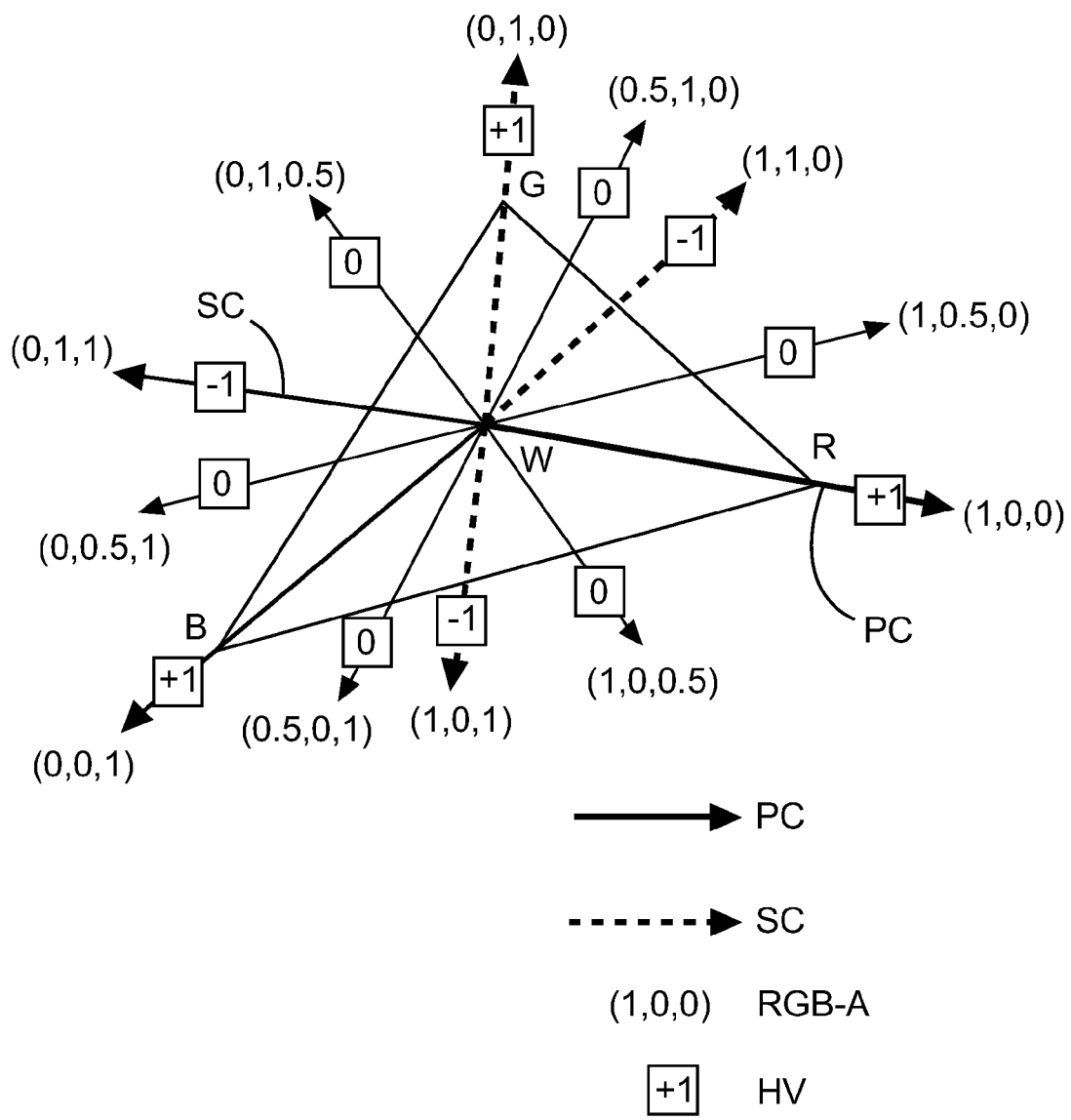
FIG. 7 shows an illustration of models for the luminescence, the saturation and the hue.

FIG. 7 shows an illustration of modules for the luminance, the saturation and the hue. These modules are used by the luminance and saturation detector LSHD to determine the luminance and saturation properties of a pixel. According to a first step, the amplitudes of sub-pixels are squared such that these values correspond to the values in the linear light domain The square is an approximation of a gamma factor of 2.2 if the adaptive branch is used. Thereafter, the sub-pixels are shuffled. The sub-pixels are ranked in order of their magnitude. The value with the highest magnitude is referred to as "max", the next value corresponds to "med" (medium) and the last value corresponds to "min". Based on these values, the properties of the luminescence, the saturation and the hue is calculated or derived.

$$L = \frac{Max + Min}{2}$$

$$S = \frac{Max - Min}{Max + Min}$$

$$H = \frac{Max + Min - 2 \cdot Med}{Max - Min}$$

with Min=L·(1−S), Med=L·(1−S·H), and Max=L·(1+S),

The value of the saturation corresponds to the modulation depth between sub-pixels. The value of the hue relates to the direction of the vector with respect to a primary or secondary color PC, SC. The bottom part of FIG. 7 depicts those values of the hue if the primary PC and secondary colors SC are also taken into account. When determining the hue HU, normalized values are produced. Accordingly, the values for max, med, min with respect to the luminance and the saturation will stay within a range of 0 and 1 while the values of the hue will be within a range of −1 and +1. The saturation and hue values are independent of the average luminance amplitude of a pixel. This is of significance as independent luminance and saturation values are required to control the color gamut mapping process.

Figure 8:
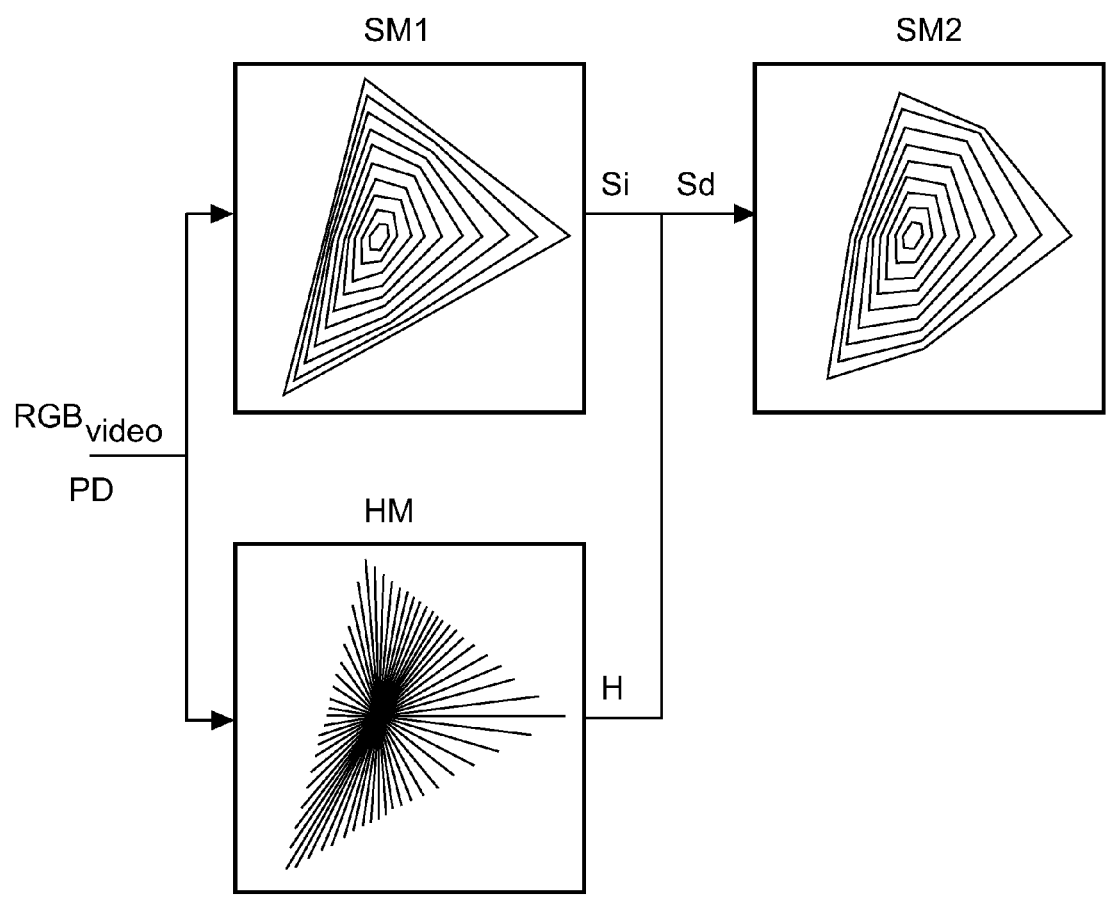
FIG. 8 shows an illustration of models of a hue corrected saturation.

FIG. 8 shows an illustration of modules of a hue corrective saturation. According to FIG. 8, firstly the saturation according to the saturation model SM1 and the hue according to the hue model HM are calculated as shown according to FIG. 7 based on a saturation model SM1 with no hue correction and a hue model HM. Thereafter, the measured saturation $S_I$ of those colors which have a vector pointing into the direction of secondary colors is reduced by "m", which corresponds to the so-called modulation index. In the top right corner of FIG. 8, the modulation index is selected such that the detected saturation $S_d$ is approximately proportional to the distance between the pixel color coordinates and the white point.

$$S_d = \left[1 - \frac{m \cdot s_i}{2} \cdot (1-H)\right] s_i \text{ with } m = 1 - S_{sd}$$

Now, the units of the color gamut system are described in more detail.

Figure 9:
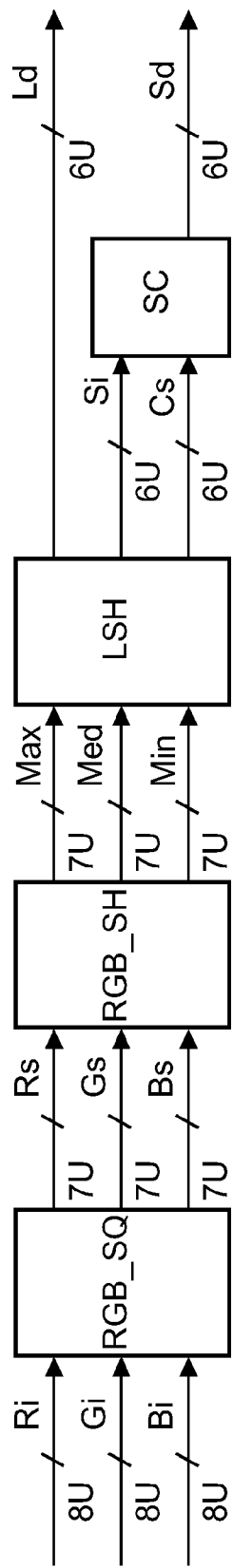
FIG. 9 shows a block diagram of a LSHD detector according to a second embodiment.

FIG. 9 shows a block diagram of a LSHD detector according to a second embodiment. This LSHD detector according to the second embodiment may be used in the color gamut mapping system according to FIG. 5. The LSHD detector comprises a RGB square unit RGB_SQ, a RGB shuffler unit RGB_SH, a LSH unit and a saturation correction unit SC. The RGB square unit RGB_SQ squares the amplitudes of the sub-pixels Ri, Bi, Gi. Preferably, the square is calculated as an eight bit number multiplied with a six bit number. The result thereof is depicted as a seven bit value. The RGB shuffler unit RGB_SH is coupled at its input to the output Rs, Gs, Bs of the RGB square unit. The RGB shuffler unit RGB_SH serves to rank the sub-pixels in the order of the value of their amplitude. The RGB shuffler unit outputs a maximum MAX, a medium MED and a minimum value MIN. Based on these values, the luminescence $L_D$, the internal saturation Si and the correction factor for the saturation $C_S$ is calculated by the LSH unit LSH and outputted. The saturation connection unit SC receives the internal saturation Si and the correction fact Cs and outputs corrected saturation Sd. The output values of the LSH unit correspond to the maximum for an optimization of calculation reasons in the luminescence saturation domain.

Accordingly, in the RGB square unit RGB_SQ, the square values are calculated as follows:

$$R_s = (R_i)^2, G_s = (G_i)^2, B_s = (B_i)^2 \text{ with } Ri, Gi, Bi = 8, -8, U \text{ and } Rs, Gs, Bs = 7, -7, U$$

The operation of the RGB shuffling unit can be described as follows:

$$\text{Max} = \text{MAX}(R_s, G_s, B_s), \text{Med} = \text{MED}(R_s, G_s, B_s), \text{Min} = \text{MIN}(R_s, G_s, B_s)$$

with Rs, Gs, Bs=7, −7, U, and Max, Med, Min=7, −7, U

The operation of the LSH unit is described as follows:

$$L_d = \text{Max}, \quad S_i = \frac{\text{Max} - \text{Min}}{\text{Max} + \text{Min}},$$
$$C_s = \frac{\text{Med} - \text{Min}}{\text{Max} + \text{Min}}$$

with Max, Med, Min=7, −7, U and Ld, Si, Cs=6, −6, U

The saturation correction is calculated as follows:

$$S_d = S_i \cdot \left(1 - \frac{C_s}{4}\right), \text{ with } Si, Sc = 6, -6, U, \text{ and } Sd = 6, -6, U$$

Figure 10:
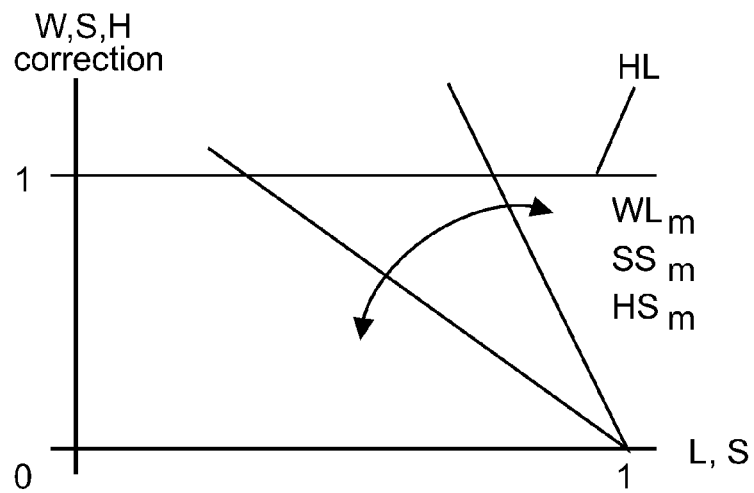
FIG. 10 shows an illustration of a transfer curve of a modulator.

FIG. 10 shows an illustration of the transfer curve of a modulator. Here, the transfer curve is modified by the slope. The input parameters and the output correction factors relate to normalized values. The depicted horizontal line HL represents the limitation of the correction values to 1. If the input values are larger, the slope transfer will determine the output. A correction value of 1 will indicate that the corresponding property is completely part of the resulting video matrix. A value of zero will indicate that the corresponding correction property is skipped in the video matrix.

Figure 11:
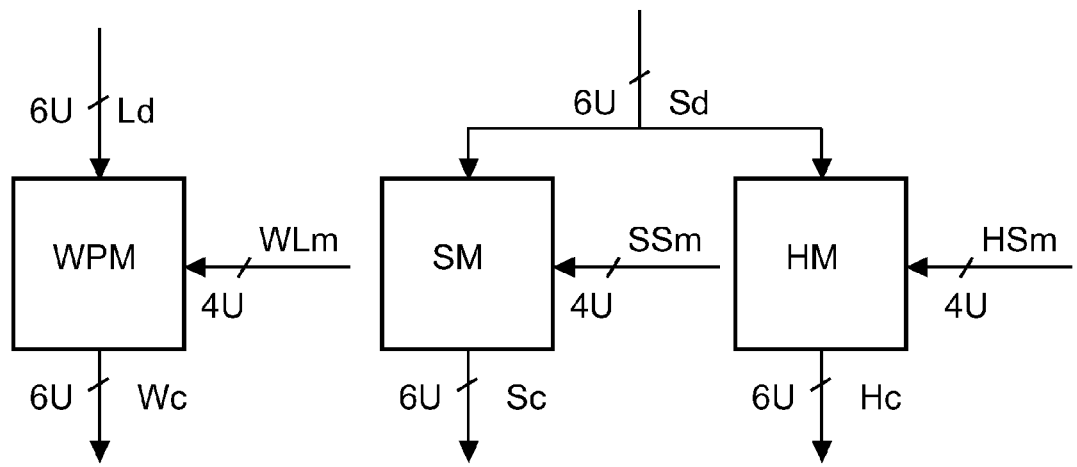
FIG. 11 shows a block diagram of a WSH modulator according to a third embodiment.

FIG. 11 shows a block diagram of WSH modulator according to a third embodiment. The WSH modulator according to the third embodiment can be used in the color gamut mapping system according to FIG. 5. The modulator according to FIG. 11 comprises a white point modulator WPM, a saturation modulator SM and a hue modulator HM. By means of these three modulators, the luminescence and saturation properties Ld, Sd from the LSH detector LSHD are transformed into correction factors Hc, Wc, Sc for determining the white point, the saturation and the hue correction. In order to facilitate the processing of these functions and to save hardware resources, the ideal curves for these modulators correspond to a linear function as depicted in FIG. 11. The parameters $WL_m$, $SS_m$ and $HS_m$ correspond to the linear function and are inputted to the WSH modulator.

The operation of the white point modulator WPM can be described by the following equation:

$$W_c = (1 - L_d) + (WL_m - WL_m \cdot L_d)$$

with Ld=6, −6, U, WLm=4, −3, U, and Wc=6, −6, U

The operation of the saturation modulator can be described as follows:

$$S_c = (1 - S_d) + (SS_m - SS_m \cdot S_d)$$

with Sd=6, −6, U, SSm=4, −3, U, and Sc=6, −6, U

The operation of the hue modulator HM can be described as follows:

$$H_c = (1 - S_d) + (HS_m - HS_m \cdot S_d), \text{with } Sd = 6, -6, U, \\ HSm = 4, -3, U, \text{and } Hc = 6, -6 - U$$

Figure 12:
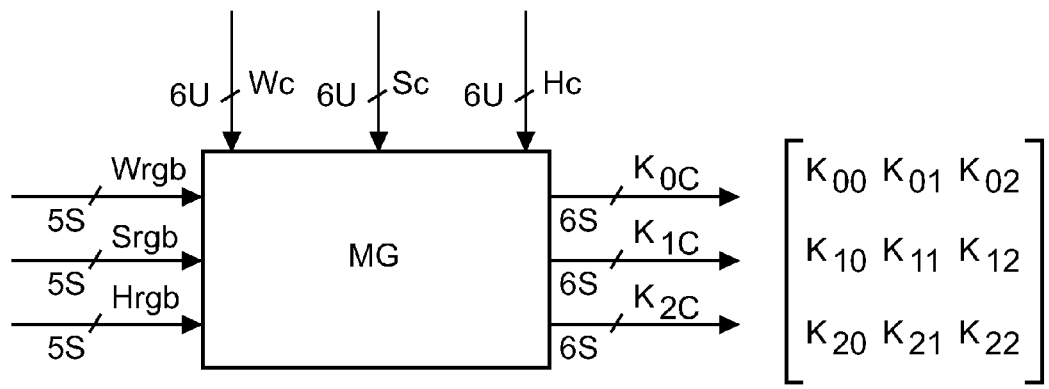
FIG. 12 shows a block diagram of a matrix generator according to a fourth embodiment.

FIG. 12 shows a block diagram of a matrix generator according to a fourth embodiment. The matrix generator CGMG according to the fourth embodiment can be used in the mapping system according to FIG. 5. The color gamut matrix generator CGMG is used to generate nine coefficients which are used for the color gamut mapping on the basis of the allowed amount of white point, saturation and hue correction Wc, Sc, Hc from a previous block. The nine parameters are calculated based from the measured data of a display module. Preferably, the nine parameters are defined to make a calculation of the coefficients easy when the required correction is taken into account. The relation between the coefficients and the nine parameters is as follows:

$$W_R = s_1 + g_2 + b_1 - 1$$

$$S_R = \frac{r_1 + r_2}{2}$$

$$H_R = \frac{r_1 - r_2}{2}$$

$$W_G = r_1 + s_2 + b_2 - 1$$

$$S_G = \frac{g_1 + g_2}{2}$$

$$H_G = \frac{g_1 - g_2}{2}$$

$$W_B = r_2 + g_1 + s_3 - 1$$

$$S_B = \frac{b_1 + b_2}{2}$$

$$H_B = \frac{b_1 - b_2}{2}$$

Figure 13:
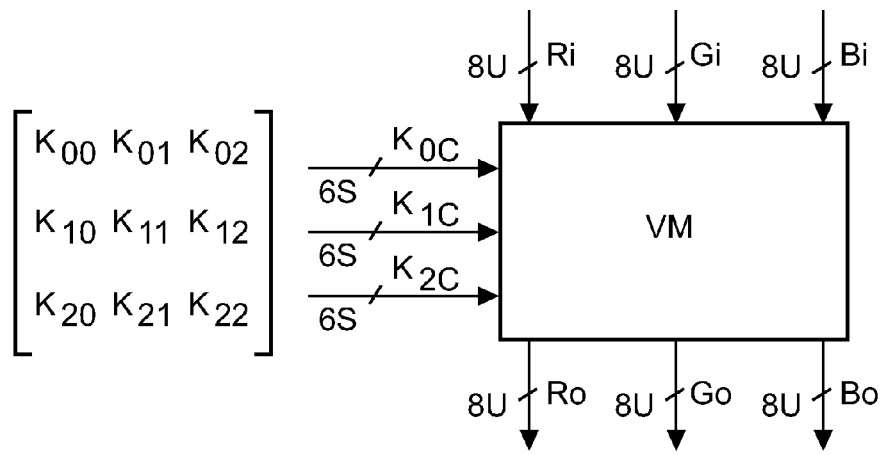
FIG. 13 shows a block diagram of a color gamut mapping unit according to a fifth embodiment.

The video matrix $MTX_{CGM}$ is calculated in the linear light domain from the measurement data. Thereafter, these coefficients are compensated as no gamma and de-gamma operation is performed. Accordingly, based on these values, the nine parameters are calculated as follows:

$$K_{10} = S_r \cdot S_c + H_r \cdot H_c$$

$$K_{20} = S_r \cdot S_c - H_r \cdot H_c$$

$$K_{21} = S_g \cdot S_c + H_g \cdot H_c$$

$$K_{01} = S_g \cdot S_c - H_g \cdot H_c$$

$$K_{02} = S_b \cdot S_c + H_b \cdot H_c$$

$$K_{12} = S_b \cdot S_c - H_b \cdot H_c$$

$$K_{00} = W_r \cdot W_c - S_r \cdot W_c \cdot (1 - S_c)$$

$$K_{11} = W_g \cdot W_c - S_g \cdot W_c \cdot (1 - S_c)$$

$$K_{22} = W_b \cdot W_c - S_b \cdot W_c \cdot (1 - S_c)$$

with Wc, Sc, Hc=6, −6, U; Wr, Wg, Wb=5, −5, S; Sr, Sg, Sb=5, −5, S; and Hr, Hg, Hb=5, −5, S FIG. 13 shows a block diagram of a video matrix unit according to a fifth embodiment. The color gamut mapping unit 20, i.e. a video matrix unit VM according to the fifth embodiment can be used in the mapping system according to FIG. 5. The video matrix unit VM 20 serves to perform the color gamut mapping for the video processing. The input pixel vector $(R_I, G_I, B_I)$ is multiplied by the matrix coefficients $K_{00} \ldots K_{22}$ in order to obtain a color gamut mapped output pixel vector $R_O, G_O, B_O$. Preferably, the amplitudes of these coefficients are close to a unity matrix, i.e. the diagonal coefficients are around 1 and the other coefficients are around 0. Therefore, the output pixel vector can be described as follows:

$$\begin{bmatrix} R_0 \\ G_0 \\ B_0 \end{bmatrix} = \begin{bmatrix} c_{00} & c_{01} & c_{02} \\ c_{10} & c_{11} & c_{12} \\ c_{20} & c_{21} & c_{22} \end{bmatrix} \cdot \begin{bmatrix} R_i \\ G_i \\ B_i \end{bmatrix} \Leftrightarrow$$

$$\begin{bmatrix} 1 + K_{00} - K_{01} - K_{02} & K_{01} & K_{02} \\ K_{10} & 1 - K_{10} + K_{11} - K_{12} & K_{12} \\ K_{20} & K_{21} & 1 - K_{20} - K_{21} + K_{22} \end{bmatrix} \cdot \begin{bmatrix} R_i \\ G_i \\ B_i \end{bmatrix}$$

Figure 14:
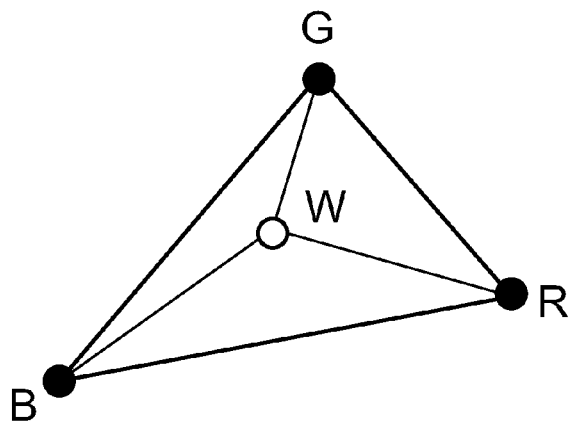
FIG. 14 shows a representation of the calculation of XYZ matrices.

The color gamut mapping can be performed as follows:

$$R_0 = R_i + K_{00} \cdot R_i + K_{01} \cdot (G_i - R_i) + K_{02} \cdot (B_i - R_i)$$

$$G_0 = G_i + K_{11} \cdot G_i + K_{12} \cdot (B_i - G_i) + K_{10} \cdot (R_i - G_i)$$

$$B_0 = B_i + K_{22} \cdot B_i + K_{20} \cdot (R_i - B_i) + K_{21} \cdot (G_i - B_i)$$

with Ri, Gi, Bi=8, −8, U, $K_{00} \ldots K_{11}$=6, −6, S, and Ro, Go, Bo=8, −8, U FIG. 14 shows a representation of a calculation of XYZ matrices. In FIG. 14, the calculation of the OTP parameters based on the input standard and the measured data of the display. Here, the parameters $W_{RGB}$, $S_{RGB}$ and $H_{RGB}$ define the color gamut mapping while the parameters $WL_M$, $SS_M$ and HSM define a trade-off between the color mapping and soft clipping.

$$x_w = \frac{\frac{x_r}{y_r} \cdot Y_R + \frac{x_g}{y_g} \cdot Y_G + \frac{x_b}{y_b} \cdot Y_B}{\frac{Y_R}{y_r} + \frac{Y_G}{y_g} + \frac{Y_B}{y_b}}$$

$$y_w = \frac{Y_R + Y_G + Y_B}{\frac{Y_R}{y_r} + \frac{Y_G}{y_g} + \frac{Y_B}{y_b}}$$

$$Y_w = Y_R + Y_G + Y_B$$

The values of k1 and k2 are used to determine the RGB ratio for the white point:

$$Y_R = \frac{1}{1 + k_1 + k_2} \cdot Y_W$$

$$Y_G = \frac{k_1}{1 + k_1 + k_2} \cdot Y_W$$

$$Y_B = \frac{k_2}{1 + k_1 + k_2} \cdot Y_W$$

$$k_1 = \frac{x_w \cdot y_r + x_b \cdot y_w + x_r \cdot y_b - x_w \cdot y_b - x_b \cdot y_r - x_r \cdot y_w}{x_w \cdot y_b + x_b \cdot y_g + x_g \cdot y_w - x_w \cdot y_g - x_b \cdot y_w - x_g \cdot y_b} \cdot \frac{y_g}{y_r}$$

$$k_2 = \frac{x_w \cdot y_r + x_g \cdot y_w + x_r \cdot y_g - x_w \cdot y_g - x_g \cdot y_r - x_r \cdot y_w}{x_w \cdot y_g + x_g \cdot y_b + x_b \cdot y_w - x_w \cdot y_b - x_g \cdot y_w - x_b \cdot y_g} \cdot \frac{y_b}{y_r}$$

Accordingly, firstly the $W_{RGB}$, $S_{RGB}$ and $H_{RGB}$ parameters are calculated. This is performed by calculating the $MTX_{SRGB}$ and $MTX_{DISP}$ matrix based on the desired color standard for input images and the measurements of the display primaries and the display white point. The XYZ matrix is calculated as follows:

$$\begin{bmatrix} X \\ Y \\ Z \end{bmatrix} = \begin{bmatrix} \frac{x_r}{y_r} \cdot \frac{1}{1+k_1+k_2} & \frac{x_g}{y_g} \cdot \frac{k_1}{1+k_1+k_2} & \frac{x_b}{y_b} \cdot \frac{k_2}{1+k_1+k_2} \\ \frac{1}{1+k_1+k_2} & \frac{k_1}{1+k_1+k_2} & \frac{k_2}{1+k_1+k_2} \\ \frac{1-x_r-y_r}{y_r} \cdot \frac{1}{1+k_1+k_2} & \frac{1-x_g-y_g}{y_g} \cdot \frac{k_1}{1+k_1+k_2} & \frac{1-x_b-y_b}{y_b} \cdot \frac{k_2}{1+k_1-k_2} \end{bmatrix} \cdot \begin{bmatrix} R \\ G \\ B \end{bmatrix}$$

Based on this matrix, the color gamut matrix $MTX_{CGM}$ in the linear light domain can be calculated as follows:

$$MTX_{cgm} = (MTX_{disp})^{-1} \cdot MTX_{EBU}$$

Figure 15:
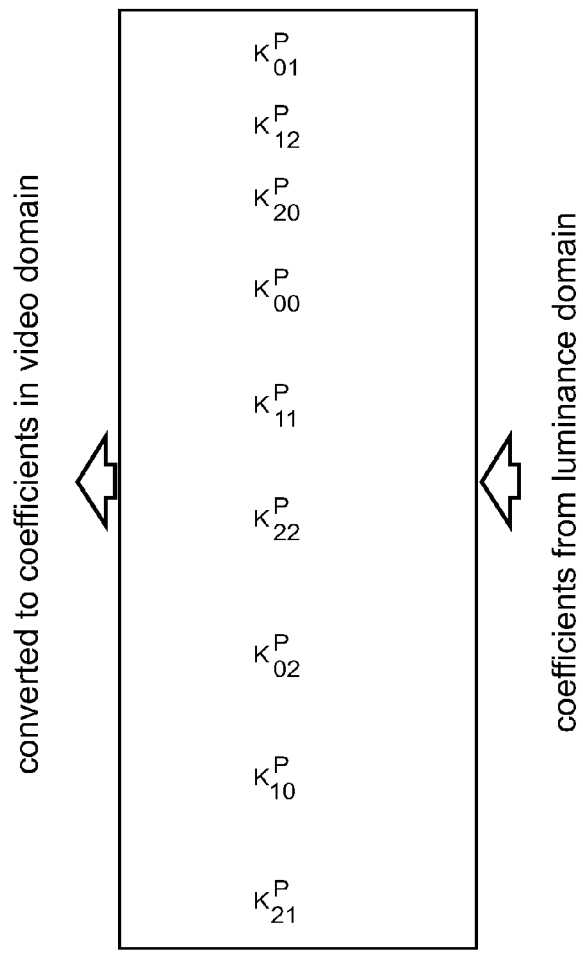
FIG. 15 shows a representation of the calculation of static matrix coefficients.

FIG. 15 shows a representation of the calculation of static matrix coefficients. Here, the transformation of the coefficients of the $MTX_{cgm}$ matrix into the perceptive domain is shown. Nine coefficients from the luminescence domain are inputted and are converted to nine coefficients in the video domain. The linear coefficients are indicated as $K^L_{row, column}$ and the perceptive coefficients are indicated as $K^P_{row, column}$. During the conversion from the coefficients from the perceptive to the linear domain a gamma value of approx. 2.2 is taken into account. As the linear domain is the only correct domain, the equations in the perceptive domain are such that they are also corrective. Therefore, the white point correction will be the same for pixel vectors being processed by both matrices. Furthermore, the first derivative of the saturation correction around the white point will also be the same for both matrices. Accordingly, the proportional increase of saturation from grey up to 30 to 40% is a good approximation of the correct values. Moreover, the first derivative of the hue correction around the white point is the same for both of the matrices. Accordingly, the angle of a pixel vector starting from the white point constitutes a good approximation of the correct angles.

The perceptive coefficients are calculated as follows:

$$K^P_{01} = (K^L_{00} + K^L_{01} + K^L_{02})^{\frac{1}{\gamma}-1} \cdot K^L_{01}$$

$$K^P_{12} = (K^L_{10} + K^L_{11} + K^L_{12})^{\frac{1}{\gamma}-1} \cdot K^L_{12}$$

$$K^P_{20} = (K^L_{20} + K^L_{21} + K^L_{22})^{\frac{1}{\gamma}-1} \cdot K^L_{20}$$

$$K^P_{00} = \frac{1}{2}(K^L_{00} + K^L_{01} + K^L_{02})^{\frac{1}{\gamma}} \cdot \left(1 + \frac{+K^L_{00} - K^L_{01} - K^L_{02}}{K^L_{00} + K^L_{01} + K^L_{02}}\right)$$

$$K^P_{11} = \frac{1}{2}(K^L_{10} + K^L_{11} + K^L_{12})^{\frac{1}{\gamma}} \cdot \left(1 + \frac{-K^L_{10} + K^L_{11} - K^L_{12}}{K^L_{10} + K^L_{11} + K^L_{12}}\right)$$

$$K^P_{22} = \frac{1}{2}(K^L_{20} + K^L_{21} + K^L_{22})^{\frac{1}{\gamma}} \cdot \left(1 + \frac{-K^L_{20} - K^L_{21} - K^L_{22}}{K^L_{20} + K^L_{21} + K^L_{22}}\right)$$

$$K^P_{02} = \frac{1}{2}(K^L_{00} + K^L_{01} + K^L_{02})^{\frac{1}{\gamma}} \cdot \left(1 + \frac{-K^L_{00} - K^L_{01} + K^L_{02}}{K^L_{00} + K^L_{01} + K^L_{02}}\right)$$

$$K^P_{10} = \frac{1}{2}(K^L_{10} + K^L_{11} + K^L_{12})^{\frac{1}{\gamma}} \cdot \left(1 + \frac{+K^L_{10} - K^L_{11} - K^L_{12}}{K^L_{10} + K^L_{11} + K^L_{12}}\right)$$

$$K^P_{21} = \frac{1}{2}(K^L_{20} + K^L_{21} + K^L_{22})^{\frac{1}{\gamma}} \cdot \left(1 + \frac{-K^L_{20} + K^L_{21} - K^L_{22}}{K^L_{20} + K^L_{21} + K^L_{22}}\right)$$

Thereafter, the parameters $W_{RGB}$, $S_{RGB}$ and $H_{RGB}$ can be calculated as follows:

$$W_R = K^P_{00} + K^P_{01} + K^P_{02} - 1 \quad S_R = \frac{K^P_{10} + K^P_{20}}{2} \quad H_R = \frac{K^P_{10} - K^P_{20}}{2}$$

$$W_G = K^P_{10} + K^P_{11} + K^P_{12} - 1 \quad SG = \frac{K^P_{21} + K^P_{01}}{2} \quad H_G = \frac{K^P_{21} - K^P_{01}}{2}$$

$$W_B = K^P_{20} + K^P_{21} + K^P_{22} - 1 \quad SB = \frac{K^P_{02} + K^P_{12}}{2} \quad H_B = \frac{K^P_{02} - K^P_{12}}{2}$$

Figure 16:
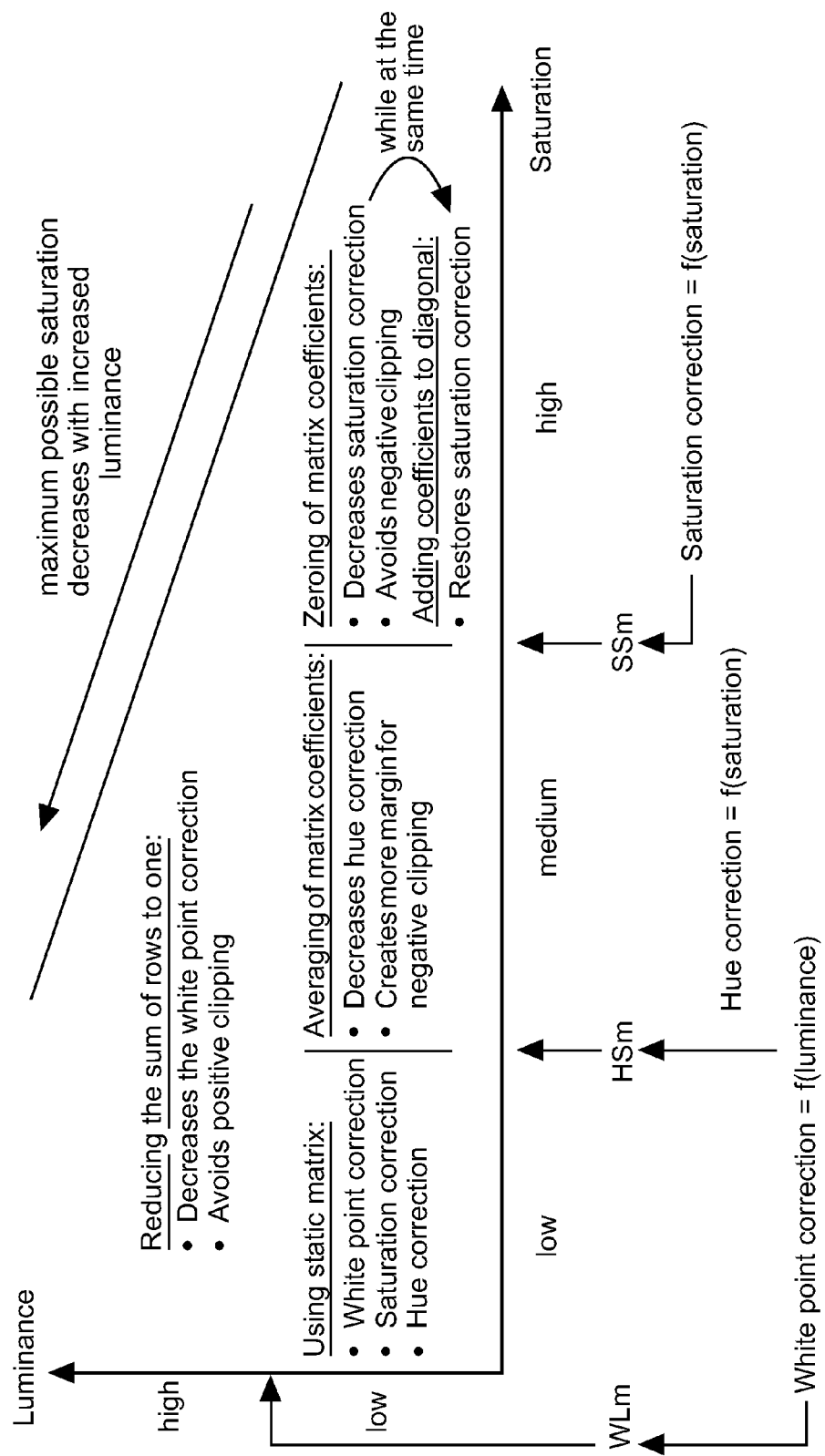
FIG. 16 shows an illustration of a trade-off between color gamut mapping and soft clipping.

FIG. 16 shows an illustration of a trade-off between color gamut mapping and soft clipping. The luminescence and saturation properties of each input pixel are determined. These properties correspond to a two dimensional vector point to an area in FIG. 16. The correct action to be taken will depend on the area which is addressed by the pixel property. In FIG. 16, four areas are defined. If the luminescence and saturation value of a pixel is below a certain threshold, the color gamut mapping is performed based on the originally determined matrix coefficients. These thresholds correspond to the value of the parameters $WL_M$ and $HS_M$ specifying the slopes of the correction transformation. However, if the luminescence is low, the matrix coefficients are adjusted firstly by removing the hue correction and followed by a removal of the saturation correction. As the saturation correction is important for the display, any gradual decrease of coefficients related to saturation correction is compensated in increasing the diagonal coefficients with the same amount. Although this is to be a rather rough first order approximation, this is sufficient for the present algorithm. Pixels having a high saturation and a low luminescence may result in negative color gamut mapping values. These coefficients which are responsible for this are modified to towards zero and a saturation loss is compensated by adding the same amount to the diagonal values. A pixel vector with a high saturation value is used as a mask for the matrix such that a column is selected where the diagonal coefficients are used as a gain factor for this color. If a pixel comprises a high luminescence, the white point correction can be removed to avoid clipping against the sealing. It should be noted that a pixel with a high luminescence cannot have a high saturation at the same time.

To determine of the hue and saturation slopes, the calculation of the parameters $WL_M$, $SS_M$ and $HS_M$ is based on the correct pixel vectors generating values below 0 or above 1.

Negative clipping in the red/cyan direction can be determined as follows:

$$R_i = V \cdot (1+\alpha) \quad R_0 = V \cdot \{(1+\alpha) \cdot K_{00} + (1-\alpha) \cdot (K_{01} + K_{02})\}$$

$$G_i = V \cdot (1-\alpha) \Rightarrow G_0 = V \cdot \{(1+\alpha) \cdot K_{10} + (1-\alpha) \cdot (K_{11} + K_{12})\}$$

$$B_i = V \cdot (1-\alpha) \quad B_0 = V \cdot \{(1+\alpha) \cdot K_{20} + (1-\alpha) \cdot (K_{21} + K_{22})\}$$

For Ro=Go=Bo=0:

$$(1+\alpha) \cdot K_{00} + (1-\alpha) \cdot (K_{01}+K_{02}) = 0$$

$$(1+\alpha) \cdot K_{10} + (1-\alpha) \cdot (K_{11}+K_{12}) = 0$$

$$(1+\alpha) \cdot K_{20} + (1-\alpha) \cdot (K_{21}+K_{22}) = 0$$

The value of α can be determined for red/cyan by $$\alpha_R = \frac{K_{00} + K_{01} + K_{02}}{K_{01} + K_{02} - K_{00}}$$

$$\alpha_G = \frac{K_{10} + K_{11} + K_{12}}{K_{11} + K_{12} - K_{10}}$$

$$\alpha_B = \frac{K_{20} + K_{21} + K_{22}}{K_{21} + K_{22} - K_{20}}$$

The value closest to zero is taken.
The value of α can be determined for green/magenta by:

$$\alpha_R = \frac{K_{00} + K_{01} + K_{02}}{K_{00} + K_{02} - K_{01}}$$

$$\alpha_G = \frac{K_{10} + K_{11} + K_{12}}{K_{10} + K_{12} - K_{11}}$$

$$\alpha_B = \frac{K_{20} + K_{21} + K_{22}}{K_{20} + K_{22} - K_{21}}$$

The value closest to zero is taken and run through the saturation model.

The color directions green/magenta and blue/yellow relate to the same calculations. When α for red/cyan is calculated, a value closest to zero is taken. First α for is calculated, next values are run through a saturation module, finally the slope is calculated.

The value of α can be determined for blue/yellow by:

$$\alpha_R = \frac{K_{00} + K_{01} + K_{02}}{K_{00} + K_{01} - K_{02}}$$

$$\alpha_G = \frac{K_{10} + K_{11} + K_{12}}{K_{10} + K_{11} - K_{12}}$$

$$\alpha_B = \frac{K_{20} + K_{21} + K_{22}}{K_{20} + K_{21} - K_{22}}$$

The value closest to zero is taken and run through the saturation model.

The above-described formulas are used to determine the $HS_M$ parameter controlling the amount of hue correction in the video matrix. Starting from a grey value, the saturation is increased until negative values are obtained. The α value closest to zero is taken to calculate the slope $HS_M$ based on the following equation:

$$S_L = \frac{2\alpha}{1+\alpha^2}$$

$$S_c = \left(1 - \frac{m}{2}S_L\right)S_L$$

$$HS_m = \frac{1}{1-S_L}$$

Thereafter, the $SS_M$ calculation is performed which only differs in the coefficients used in the matrix from calculating the slope. The hue component is already removed from the matrix coefficients before the saturation correction is skipped. Accordingly, the red, green and blue coefficients ($r_1$, $r_2$, $g_1$, $g_2$, $b_1$, $b_2$) which are responsible for the hue correction are averaged and the α value closest to zero is used to calculate the slope $SS_M$ by means of the following equation:

$$S_L = \frac{2\alpha}{1+\alpha^2}$$

$$S_c = \left(1 - \frac{m}{2}S_L\right)S_L$$

$$SS_m = \frac{1}{1-S_L}$$

The calculation of the $WL_M$ parameters are performed by determining positive clipping values in a red/cyan direction:

$$R_i = V \cdot (1+\alpha) \; R_0 = V \cdot \{(1+\alpha) \cdot K_{00} + (1-\alpha) \cdot (K_{01}+K_{02})\}$$

$$G_i = V \cdot (1-\alpha) \Rightarrow G_0 = V \cdot \{(1+\alpha) \cdot K_{10} + (1-\alpha) \cdot (K_{11}+K_{12})\}$$

$$B_i = V \cdot (1-\alpha) \; B_0 = V \cdot \{(1+\alpha) \cdot K_{20} + (1-\alpha) \cdot (K_{21}+K_{22})\}$$

For Ro=Go=Bo=1:

$$(1+\alpha) \cdot K_{00} + (1-\alpha) \cdot (K_{01}+K_{02}) = V^{-1}$$

$$(1+\alpha) \cdot K_{10} + (1-\alpha) \cdot (K_{11}+K_{12}) = V^{-1}$$

$$(1+\alpha) \cdot K_{20} + (1-\alpha) \cdot (K_{21}+K_{22}) = V^{-1}$$

The value V is determined for red/cyan by the equations:

$$V_R = \frac{1}{(K_{00}+K_{01}+K_{02}) + \alpha \cdot (K_{00}-K_{01}-K_{02})}$$

$$V_G = \frac{1}{(K_{10}+K_{11}+K_{12}) + \alpha \cdot (K_{10}-K_{11}-K_{12})}$$

$$V_B = \frac{1}{(K_{20}+K_{21}+K_{22}) + \alpha \cdot (K_{20}-K_{21}-K_{22})}$$

Furthermore, V is determined for green/magenta $$V_R = \frac{1}{(K_{00}+K_{01}+K_{02}) + \alpha \cdot (K_{01}-K_{00}-K_{02})}$$

$$V_G = \frac{1}{(K_{10}+K_{11}+K_{12}) + \alpha \cdot (K_{11}-K_{10}-K_{12})}$$

$$V_B = \frac{1}{(K_{20}+K_{21}+K_{22}) + \alpha \cdot (K_{21}-K_{20}-K_{22})}$$

and V is calculated for blue/yellow.

$$V_R = \frac{1}{(K_{00}+K_{01}+K_{02}) + \alpha \cdot (K_{02}-K_{00}-K_{01})}$$

$$V_G = \frac{1}{(K_{10}+K_{11}+K_{12}) + \alpha \cdot (K_{12}-K_{10}-K_{11})}$$

$$V_B = \frac{1}{(K_{20}+K_{21}+K_{22}) + \alpha \cdot (K_{22}-K_{20}-K_{21})}$$

The value closest to zero is taken and run through the luminance model.

Accordingly, the $V_P$ value which is closest to zero is used to reduce the value of α to zero. This is because the white point correction has to be removed from pixels with a high luminescence. The value of $V_P$ may be used to calculate the $WL_M$ slope:

$$V_L = V_P^2$$

$$WL_m = \frac{1}{1 - V_P}$$

Figure 17:
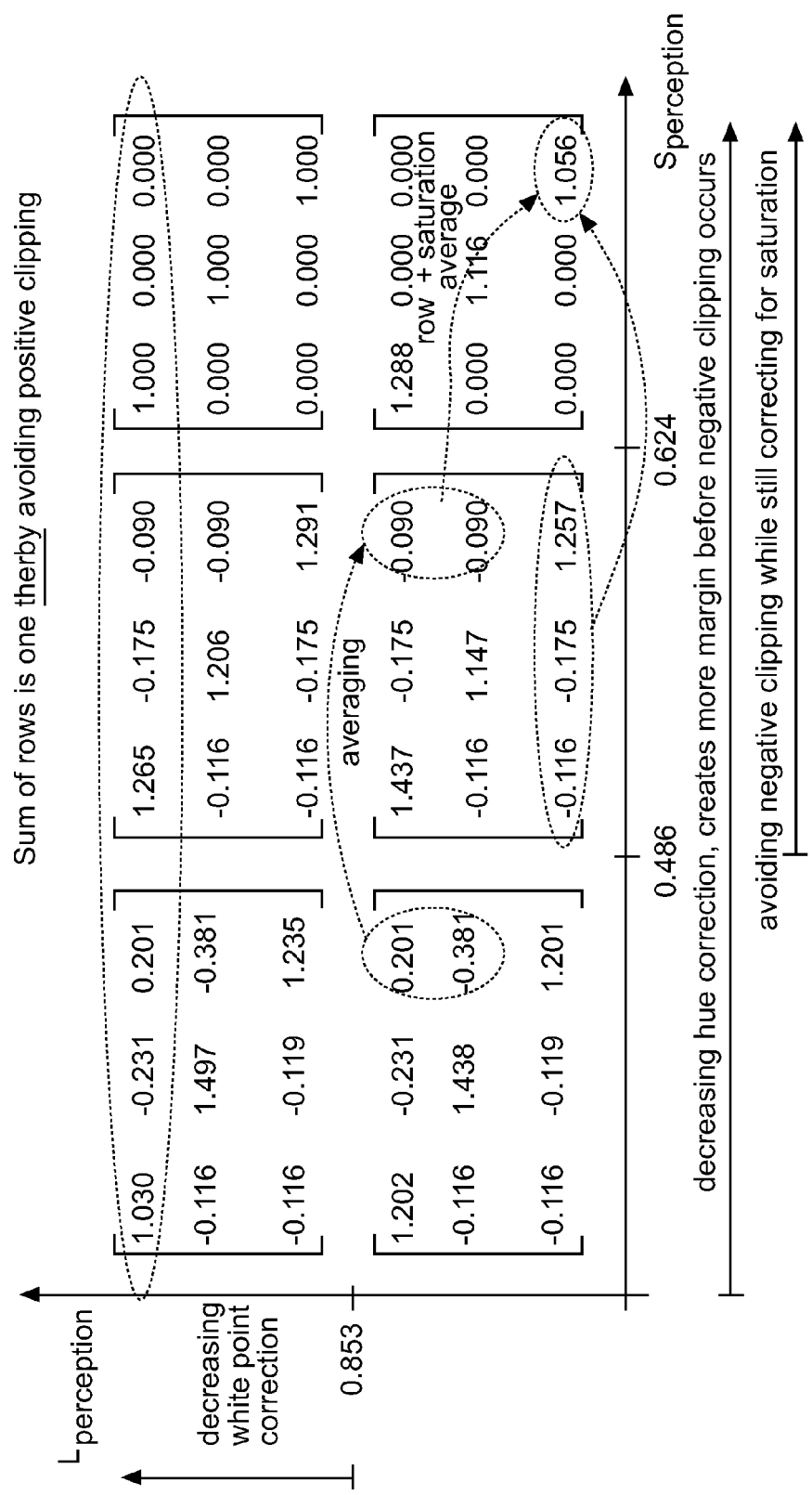
FIG. 17 shows a representation of an example of an adaptive matrix coefficient.

FIG. 17 shows a representation of an example of an adaptive matrix coefficient. If the luminescence values are below 0,853 and the saturation values are below 0,486 (please note that these values are merely used for illustrative purposes and should not be considered as restrictive) the original color gamut matrix coefficients are used. If the saturation values are between 0,486 and 0,264, the red, green and blue coefficients are averaged, reducing the hue correction. If the saturation values are above 0,624, the red, green and blue coefficients are decreased to zero, reducing the saturation correction. At the same time, the average values are added to the diagonal values, to maintain luminance.

As an illustrative example, the value 1,288 in the right bottom matrix of FIG. 18 is calculated from the sum of the original row in the left bottom matrix (1,201−0,231+0,201=1, 171). The average value of the red column is subtracted from that (1,171−(−0,116)=1,288. Accordingly, the white point and saturation correction for the red component correspond approx. to a first order approximation. If the luminescence value is above 0.853, the sum of the rows are made equal to one. This is preferably performed by adjusting the diagonal coefficients. Then the diagonal coefficients of the left two matrices are compared. The sum of the red row in the bottom matrix corresponds to 1,171 while the sum of the same row in the top matrix is equal to one. Then the red diagonal coefficients are calculated as 1−(−0,231)−0,201=1,030.

Here, the color gamut mapping in the linear domain as shown in the left triangle is compared to the color gamut mapping in the perceptive domain as depicted in the right angle without any adaptation of the matrix coefficients. As shown in the right angle, the pixel colors around the white point are closed to the desired colors. The saturation values as plotted in increasing steps of 10% up to 30% to 40% correspond to a good approximation. If high saturation values are present, clipping occurs for both triangles due to the absence of the adaptive processing according to the first embodiment.

Here, the adaptation of the matrix coefficients according to the first embodiment has been employed. If the mapping at the blue vertex of the smaller display triangle is compared, the left triangle shows a clipping against the boundaries of the triangle, while the right triangle shows a much smoother trajectory from grey to blue. Although this difference appears to be rather small, the impact on front screen performance with natural images is rather big. This is in particular true if a spatial relation between pixels is present.

The above described color mapping can be used to compress a gamut for mobile displays. Furthermore, the gamut can be extended for example wide gamut LCD TV. Moreover, the color space can be modified for multi-primary displays. User settings like saturation and color temperature can be executed. A picture enhancement by means of a blue stretch or green stretch can be performed.

The above-described principles of the invention (i.e. the adaptive color gamut mapping) may be used to compress the gamut for mobile displays. On the other hand, the gamut may be expanded for white gamut LCD television systems. The color space for multi-primary displays can be modified.

Moreover, user settings like saturation, color temperature or the like can be executed and a picture enhancement, e.g. a blue stretch, green stretch can be achieved.

The above described adaptive color gamut mapping can be used to enhance color settings for display with limited color capabilities by performing a gamut compression. For mobile LCD displays which require a minimum power dissipation, limited colors are provided as the color spectrum of the backlight and the limited thickness and transmission of color filters are present. Moreover, mobile LCD displays only enable a poor performance with respect to contrast and bit depth such that color gamut mapping is performed without using an adaptive branch which reduces the required hardware while introducing artifacts.

PLED/OLED displays have limited colors because of the degradation of materials with optimal primary colors. Therefore, a preferred spectrum of primaries will be exchanged for a maximum lifetime. LCD front projection displays also may have limited colors due to the color spectrum of the light source as well as due to limited thickness and transmission of the color filters.

The white point of bright displays may correspond to the maximum output of the RGB but may not correspond to the D65 white point. In the case of very bright pixels, the white point should be corrected as the correction may result in a reduced luminance. However, for less bright pixels, the white point can be corrected while still maintaining a correct luminance. According to an embodiment, a switch between predefined white point settings (e.g. cool (8500K), normal (D65) and warm (5000K)) can be performed. For a gamut expansion, i.e. a wide and bright gamut, the adaptive color gamut mapping can improve the color settings of such devices. LCD-TV displays may have a wide gamut color because of the color spectrum of the backlight combined with their color filters. The displays also may comprise a white sub-pixel to enhance the brightness and efficiency. The adaptive color gamut mapping may be used to reshape the color space accordingly supporting a bright gamut color. The adaptive color gamut mapping can be used to prevent clipping artifacts during a rendering process.

In case of multi-primary displays, the adaptive color gamut mapping may be used to enhance the color settings of displays with white gamut color capabilities as such displays may comprise an extra primary color to enhance the gamut and support an efficient use of the backlight spectrum. Adaptive color gamut mapping may be used to reshape the color space supporting bright gamut colors. The adaptive color gamut mapping may be used to prevent clipping artifacts during the rendering process.

On the other hand, user settings may be implemented by the adaptive color gamut mapping such that the personal preferences of a user can be used for the setting of the display. This may be performed by modifying the input coefficients of the sRGB input gamut to user specific coefficients which may describe a modified gamut before it is used in the mapping process. The mapping process may be used to map the 3D input gamut to a 3D output gamut wherein an input image appears with the user preferred saturation brightness, hue and whitepoint setting.

Furthermore, an image enhancement can be performed by the adaptive color gamut mapping. By means of additional adaptive processes, analyzing properties of the input pixel and depending on their location in the 3D color space with respect to hue, saturation and brightness, these pixels are mapped to a different location with a different hue, saturation and brightness. Accordingly, the input image may appear differently on a display as e.g. some green colors are getting more saturation, some skin-tone colors are getting a more ideal hue, bright white colors are getting a white-point towards blue and dark colors are getting less luminance and more saturation.

The above described color gamut mapping can be used in any display devices to enhance the front-of-screen performance. The adaptive color gamut mapping may also be embodied in display drivers or display modules. Alternatively or in addition, the above described adaptive color gamut mapping algorithm may be implemented in a companion chip. This is advantageous as only a limited amount of additional hardware is required to perform the respective algorithm. In addition or alternatively, the adaptive color gamut mapping algorithm may also be executed in software on a programmable processing device. Such a software algorithm may run on an ARM platform or on a media processor like Trimedia.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. In the device claim enumerating several means, several of these means can be embodied by one and the same item of hardware. The mere fact that certain measures are recited in mutually different dependent claims does not indicate that a combination of these measures cannot be used to advantage.

Furthermore, any reference signs in the claims shall not be constrained as limiting the scope of the claims.

What is claimed is:

1. A video processing device, comprising:
    a luminance and saturation detector adapted to detect the luminance values and the saturation values of pixels of an input video signal, wherein the luminance and saturation detector includes:
        a RGB squaring unit adapted to square amplitudes of sub-pixels of the pixels of the input video signal,
        a RGB shuffler unit adapted to rank the sub-pixels based on the respective squared amplitude values of the sub-pixels,
        a luminance and saturation calculation unit adapted to calculate, for each pixel, the luminance value, an internal saturation and a first saturation correction factor, and
        a saturation correction unit adapted to output the saturation value for each pixel, wherein said saturation value for said pixel is a corrected saturation value based on said internal saturation and the first saturation correction factor;
    a white-point, saturation and hue modulator adapted to transform the luminance and saturation values of each pixel of the input video signal into a corresponding white-point correction factor, a second saturation correction factor, and a hue correction factor;
    a color gamut matrix generating unit adapted to generate a color gamut matrix in the perception domain based on the white-point correction factor, the second saturation correction factor, and the hue correction factor;
    a color gamut mapping unit adapted to multiply the pixels of the input video signal with the color gamut matrix; and
    a clipping unit adapted to clip the results of the color gamut mapping unit which are out of a predefined range.

2. The video processing device according to claim 1, wherein the white-point, saturation and hue modulator comprises:
    a white point modulator adapted to determine, for each pixel, the white-point correction factor as $(1-L_d)+(WL_m-WL_m*L_d)$, wherein $L_d$ is the luminance value corresponding to said pixel and $WL_m$ is an input parameter of the white point modulator;
    a saturation modulator adapted to determine, for each pixel, the second saturation correction factor based on the saturation value from the luminance and saturation calculation unit; and
    a hue modulator adapted to determine, for each pixel, the hue correction factor based on the saturation value from the luminance and saturation calculation unit.

3. The video processing device according to claim 2, wherein the color gamut matrix generating unit is adapted to generate the color gamut matrix based upon measured characteristics of a display module.

4. The video processing device according to claim 3, further comprising a memory adapted to store display module specific parameters.

5. The device of claim 2, wherein the saturation modulator is adapted to generate, for each pixel, the second saturation correction factor as $(1-S_d)+(SS_m-SS_m*S_d)$, wherein $S_d$ is the saturation value corresponding to said pixel and $SS_m$ is an input parameter of the saturation modulator.

6. The device of claim 2, wherein the hue modulator is adapted to generate, for each pixel, the hue correction factor as $(1-S_d)+(HS_m-HS_m*Sd)$, wherein $S_d$ is the saturation value corresponding to said pixel and $HS_m$ is an input parameter of the hue modulator.

7. The device of claim 1, wherein the luminance and saturation calculation unit is adapted to calculate, for each pixel, the luminance value as the maximum of the squared amplitudes of the sub-pixels of said pixel.

8. The device of claim 1, wherein the luminance and saturation calculation unit is adapted to calculate, for each pixel, the first saturation correction factor as (med−min)/(max+min), wherein max is the maximum of the squared amplitudes of the sub-pixels of said pixel, min is the minimum of the squared amplitudes of the sub-pixels of said pixel, and med is the median of the squared amplitudes of the sub-pixels of said pixel.

9. The device of claim 1, wherein the saturation correction unit is adapted to output the saturation value for each pixel as $s_i*(131 c_s/4)$, wherein $s_i$ and $c_s$ are the internal saturation and the first saturation correction factor, respectively, corresponding to said pixel.

10. A method of processing color image data, comprising the steps of:
    squaring amplitudes of sub-pixels of pixels of an input video signal;
    ranking the sub-pixels based on respective squared amplitude values of the sub-pixels;
    calculating, for each pixel, a luminance value, an internal saturation, and a first saturation correction factor;
    generating a saturation value for each pixel based on the internal saturation and the first saturation correction factor for said pixel;
    transforming the luminance and saturation values of the pixels of the input video signal into a white-point correction factor, a second saturation correction factor, and a hue correction factor wherein the white-point correction factor is calculated for each pixel as $(1-L_d)+(WL_m-$ $WL_m*L_d$), wherein $L_d$ is the luminance value corresponding to said pixel and $WL_m$ is an input parameter;

generating a color gamut matrix in the perception domain based on the white-point correction factor, the second saturation correction factor, and the hue correction factor;

multiplying the pixels of the input video signal with the color gamut matrix; and clipping the results of the color gamut mapping unit which are out of a predefined range.

11. The method of claim 10, wherein transforming the luminance and saturation values of the pixels of the input video signal into the white-point correction factors, the second saturation correction factors, and the hue correction factors includes, for each pixel:

generating the corresponding white-point correction factor as $(1-L_d)+(WL_m-WL_m*L_d)$, wherein $L_d$ is the luminance value corresponding to said pixel and $WL_m$ is an input parameter; and generating the corresponding second saturation correction factor and hue correction factor based on the corresponding saturation value.

12. The method of claim 11, wherein the second saturation correction factor for each pixel is generated as $(1-S_d)+(SS_m-SS_m*S_d)$, wherein $S_d$ is the saturation value corresponding to said pixel and $SS_m$ is an input parameter.

13. The method of claim 11, wherein the hue correction factor for each pixel is generated as $(1-S_d)+(HS_m-HS_m*Sd)$, wherein $S_d$ is the saturation value corresponding to said pixel and $HS_m$ is an input parameter.

14. The method of claim 10, wherein the luminance value for each pixel is calculated as the maximum of the squared amplitudes of the sub-pixels of said pixel.

15. The method of claim 10, wherein the first saturation correction factor for each pixel is calculated as (med−min)/(max+min), wherein max is the maximum of the squared amplitudes of the sub-pixels of said pixel, min is the minimum of the squared amplitudes of the sub-pixels of said pixel, and med is the median of the squared amplitudes of the sub-pixels of said pixel.

16. The method of claim 10, wherein the saturation value for each pixel is generated as $s_i*(1-c_s/4)$, wherein $s_i$ and $c_s$ are the internal saturation and the first saturation correction factor, respectively, corresponding to said pixel.

* * * * *